No. 701,754. Patented June 3, 1902.
T. W. MORAN.
SAFETY FUEL TANK FOR AUTOMOBILES.
(Application filed Mar. 28, 1901.)
(No Model.)
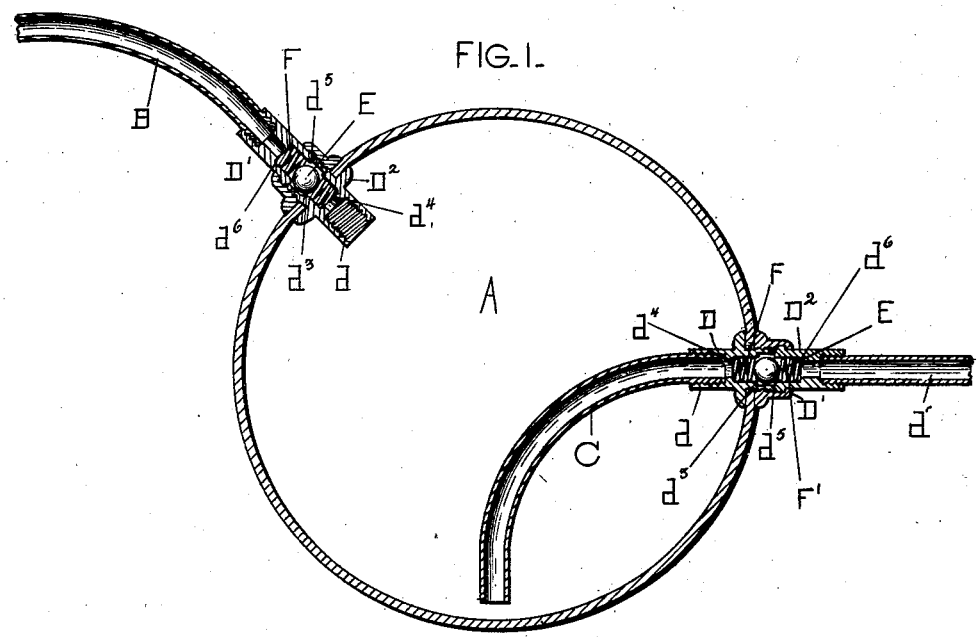
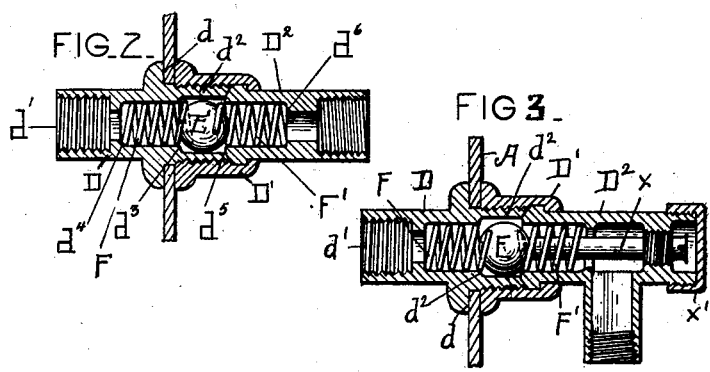
WITNESSES_
George M. Anderson
Jos Gregory
INVENTOR_
T. W. Moran,
by E. W. Anderson
his ATTORNEY_

UNITED STATES PATENT OFFICE.

THOMAS WILLIAM MORAN, OF LOUISVILLE, KENTUCKY.

SAFETY FUEL-TANK FOR AUTOMOBILES.

SPECIFICATION forming part of Letters Patent No. 701,754, dated June 3, 1902.

Application filed March 28, 1901. Serial No. 53,202. (No model.)

*To all whom it may concern:*

Be it known that I, THOMAS WILLIAM MORAN, a citizen of the United States, and a resident of Louisville, in the county of Jefferson and State of Kentucky, have made a certain new and useful Invention in Safety Fuel Tanks for Automobiles, Fire-Engines, &c.; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a cross-section of a fuel-tank having my invention applied thereto. Fig. 2 is a detail sectional view of my invention. Fig. 3 illustrates a further modification of my invention.

This invention relates to safety fuel-tanks for automobiles, fire-engines, launches, or the like, and has for its object the provision of an automatically-acting safety-valve for the feed-pipe of the tank to the burner and which will in the event of fracture or breakage of such pipe, accidentally or otherwise, automatically cut off the fuel-feed at the tank and prevent such fuel from blowing off or escaping under the pressure to which it is subjected, thereby avoiding danger of fire, explosion, destruction of the vehicle, and possible loss of life by the gasolene or vapor thereof coming in contact with the burner or the heated furnace.

With this object in view the invention consists in the novel construction and combination of parts, all as hereinafter described, and pointed out in the appended claims.

Referring to the accompanying drawings, the letter A designates the ordinary fuel-tank of an automobile, B the pipe connecting the same with the air-pressure supply, and C the fuel-feed pipe to the burner. The tank is provided with an inlet in its wall about midway of its height for this pipe C, which extends therefrom to the bottom of the tank.

D D' are two members of the valve-chamber, the part D having a shoulder $d$ abutting against the inside of the tank-wall, an inner end portion $d'$ upon one side of said shoulder and internally threaded to connect with the pipe C, and an outer end portion $d^2$, extending through the tank-wall upon the opposite side of said shoulder and provided with an external screw-thread for connection with the valve-chamber member D', which has a suitable wrench-seat. Such part D' has a revoluble extension $D^2$, having an internal screw-thread for connection with the feed-pipe, a section of which is cut out to provide room for such parts.

In the valve-chamber is the ball or other suitable valve E, a seat for such valve being provided upon one side upon an annular shoulder $d^3$ of part D, which is reduced in diameter beyond such shoulder and formed with a second annular shoulder $d^4$, a coil-spring F being located in such reduced portion, bearing upon said shoulder $d^4$ and projecting a little beyond valve-seat $d^3$ to normally hold the valve away therefrom. Upon the opposite side of the valve a seat is provided therefor at $d^5$ upon the end portion of revoluble extension $D^2$, such extension having an internal annular shoulder $d^6$, upon which bears the coil-spring F', which spring projects a little beyond valve-seat $d^5$ to normally hold the valve away therefrom. The ball-valve E, which is partly inclosed by the coil-springs, is thus normally suspended or balanced therebetween and between the two valve-seats to allow free passage for the fuel, which is fed very slowly and gradually under pressure, such feed being held in check by the increased volume of the fuel as it is vaporized in passing over the fire and by the turn-cock for feeding to the burner.

My device as described is for the purpose of providing a safety fuel-tank for automobiles, &c., or for attachment to automobiles in use by cutting out a section of the feed-pipe and applying the devices thereto, and the parts are readily detachable for purpose of cleaning, repair, &c. A similar safety-valve device is applied to the air-inlet pipe B at B' and acting in a similar manner to cut off air-pressure in case the air-pipe should be accidentally broken.

In Fig. 3 I have illustrated a further modification of the device, wherein the revoluble extension $D^2$, which in this case is made in T form, is provided with an adjustable stem $x$, having a screw-threaded engagement with such extension, such stem being provided with a suitable wrench-seat at its end portion and being adapted to be brought against the valve to unseat the same in case such should become necessary. The stem $x$ is guarded and inclosed by a cap $x'$, having a screw engagement with the extension $D^2$.

Having thus described my invention, what I claim as new, and desire to secure by Letters Patent, is—

1. A safety fuel-tank connected with a source of pressure, and provided with a feed-pipe to a burner, said tank having a valve device consisting of two tubular members, each member having a chamber, and an annular shoulder or abutment in rear of said chamber, one of said members having a valve-seat at its inner extremity, the screw-sleeve connecting said members together, the coil-springs in the chambers of said members, and having a bearing against said abutments, and the ball-valve between said springs, and inclosed thereby, substantially as specified.

2. A safety fuel-tank for automobiles connected with a source of pressure, and provided with a feed-pipe to a burner, said tank having a valve device consisting of the two members, each chambered for the reception of a coil-spring, one of said members having a valve-seat at its inner extremity, the screw-sleeve connecting said members together, the coil-springs in the chambers of said members, the valve between said springs, and means for forcing said valve from its seat when required, substantially as specified.

In testimony whereof I affix my signature in presence of two witnesses.

THOMAS WILLIAM MORAN.

Witnesses:
 E. E. SUTTON,
 H. V. SANDERS.